(12) United States Patent
Funakoshi (10) Patent No.: US 8,348,323 B2
(45) Date of Patent: Jan. 8, 2013

(54) REAR VEHICLE BODY STRUCTURE

(75) Inventor: Akihito Funakoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 13/010,716

(22) Filed: Jan. 20, 2011

(65) Prior Publication Data
US 2011/0227367 A1 Sep. 22, 2011

(30) Foreign Application Priority Data
Mar. 19, 2010 (JP) .................. 2010-064405

(51) Int. Cl.
*B62D 43/00* (2006.01)
(52) U.S. Cl. .................. 296/37.2; 296/187.11
(58) Field of Classification Search .......... 296/37.2, 296/37.1, 37.3, 193.07, 193.08, 187.11, 187.08; 224/42.12–42.3
See application file for complete search history.

(56) References Cited

U.S. PATENT DOCUMENTS

| | | | |
|---|---|---|---|
| 5,636,890 A | 6/1997 | Cooper | |
| 6,739,641 B2 | 5/2004 | McLeod et al. | |
| 7,380,856 B2 * | 6/2008 | Kobayashi et al. | 296/37.2 |
| 2004/0262934 A1 | 12/2004 | Harima et al. | |
| 2010/0225135 A1 * | 9/2010 | Taneda | 296/37.2 |

FOREIGN PATENT DOCUMENTS

| | | |
|---|---|---|
| CN | 1751938 A | 3/2006 |
| DE | 102007044428 A1 | 3/2009 |
| JP | 2004-322829 | 11/2004 |
| JP | 2004-322830 | 11/2004 |
| JP | 2004-322920 | 11/2004 |
| JP | 4022919 B2 | 11/2004 |
| JP | 4167931 B2 | 11/2004 |
| JP | 4250015 B2 | 11/2004 |

OTHER PUBLICATIONS

Chinese Office Action for corresponding CN Application No. 201110068221.9, Jul. 23, 2012.

* cited by examiner

*Primary Examiner* — Glenn Dayoan
*Assistant Examiner* — Melissa A Black
(74) *Attorney, Agent, or Firm* — Ditthavong Mori & Steiner, P.C.

(57) ABSTRACT

A rear vehicle body structure includes a rectangular frame, a box-shaped section, a spare-tire storage section, a peripheral flange, and a reinforcing member. The rectangular frame has a substantially rectangular shape in a plan view and includes left and right rear frames and front and rear cross members so as to contain a spare tire. The box-shaped section has a substantially rectangular bottom so as to be placed in the rectangular frame. The spare-tire storage section is provided in the box-shaped section and has an opening at an upper part of the box-shaped section to receive the spare tire. The peripheral flange projects outward from the upper part so as to be attached to the rectangular frame. The reinforcing member extends along the bottom in a front-rear direction of a vehicle body and is laid between the front and rear cross members.

19 Claims, 9 Drawing Sheets

REAR VEHICLE BODY STRUCTURE

CROSS-REFERENCE TO RELATED APPLICATIONS

The present application claims priority under 35 U.S.C. §119 to Japanese Patent Application No. 2010-064405, filed Mar. 19, 2010, entitled "Rear Vehicle Body Structure". The contents of this application are incorporated herein by reference in their entirety.

BACKGROUND OF THE INVENTION

1. Field of the Invention

The present invention relates to a rear vehicle body structure.

2. Description of the Related Art

A general rear vehicle body structure has a spare-tire storage section at the rear of a floor panel, and a spare tire can be stored in this spare-tire storage section. For example, U.S. Pat. No. 6,739,641 discloses a spare-tire storage section formed of resin. By thus being formed of resin, the spare-tire storage section can have a weight smaller than that of a spare-tire storage section formed of steel.

The spare-tire storage section has a substantially circular bottom portion such as to receive a spare tire. This may hinder air from smoothly flowing in one direction at a uniform flow velocity state (so-called flow-regulated state) along the bottom portion of the spare-tire storage section during traveling of the vehicle. That is, it is difficult for the bottom portion of the spare-tire storage section to have a function as an undercover that covers the bottom of the rear vehicle body structure. For this reason, a separate aerodynamic undercover needs to be provided on the lower side of the spare-tire storage section. This hinders weight reduction and cost reduction.

In addition, the rigidity of the resin spare-tire storage section is lower than that of the steel spare-tire storage section. As a method of increasing the rigidity of the resin spare-tire storage section, it is conceivable to mold the spare-tire storage section from resin reinforced by glass fiber (e.g., FRP). However, when the spare-tire storage section is molded from resin containing glass fiber, it is difficult to reduce the weight and cost of the spare-tire storage section.

SUMMARY OF THE INVENTION

According to one aspect of the present invention, a rear vehicle body structure includes a rectangular frame, a box-shaped section, a spare-tire storage section, a peripheral flange, and a reinforcing member. The rectangular frame has a substantially rectangular shape in a plan view. The rectangular frame includes left and right rear frames and front and rear cross members so as to contain a spare tire. The box-shaped section has a substantially rectangular bottom so as to be placed in the rectangular frame. The spare-tire storage section is provided in the box-shaped section. The spare-tire storage section has an opening at an upper part of the box-shaped section to receive the spare tire. The peripheral flange projects outward from the upper part so as to be attached to the rectangular frame. The reinforcing member extends along the bottom in a front-rear direction of a vehicle body. The reinforcing member is laid between the front and rear cross members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments of the present invention will be described below with reference to the attached drawings, wherein like reference numerals designate corresponding or identical elements throughout the various drawings. The terms "front (Fr)", "rear (Rr)", "left (L)" and "right (R)" are used herein to represent directions as viewed from a driver.

Embodiments

A rear vehicle body structure 10 according to the embodiment will be described.

Figure 1:
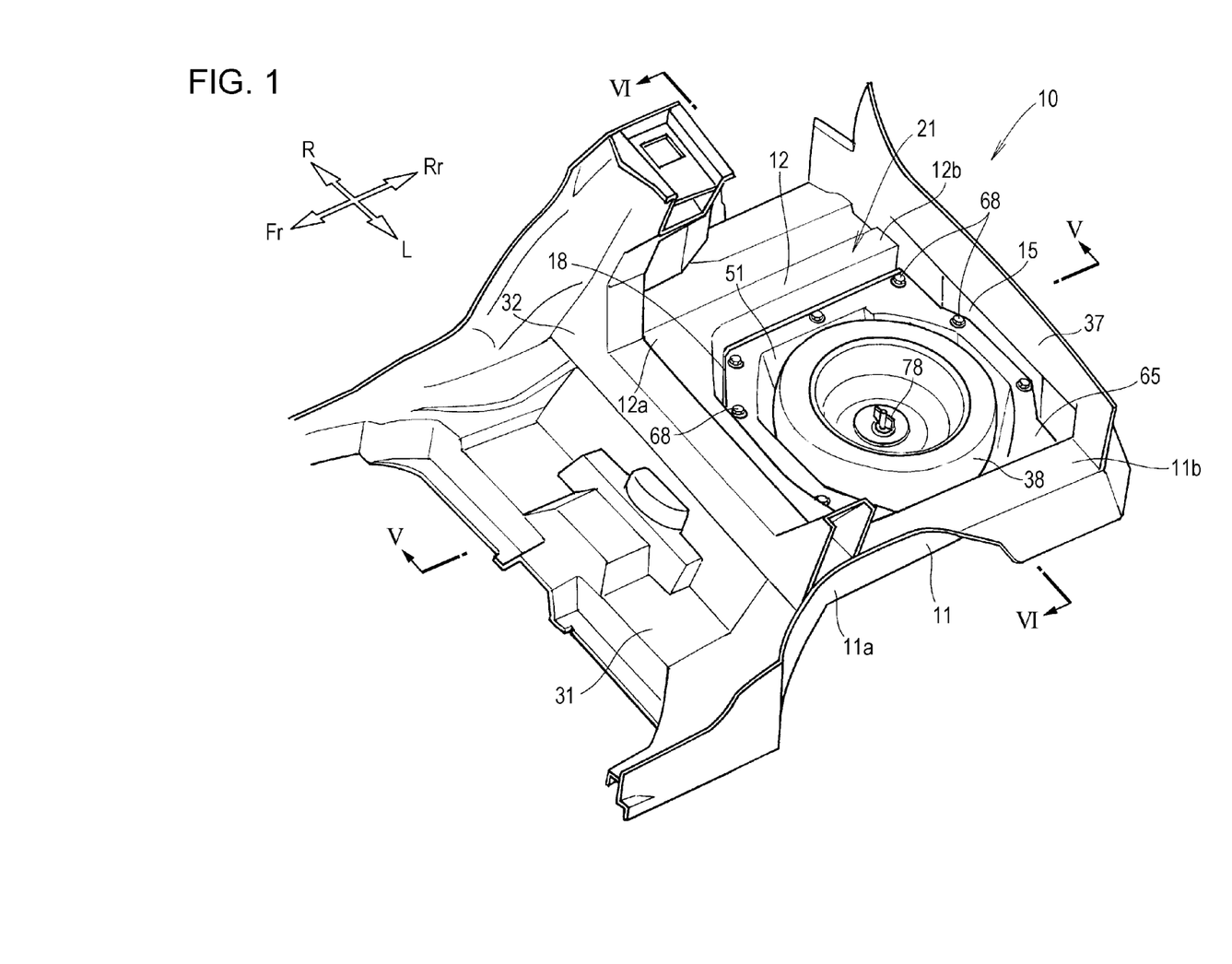
FIG. 1 is a perspective view illustrating a rear vehicle body structure according to an embodiment of the present invention.
Figure 2:
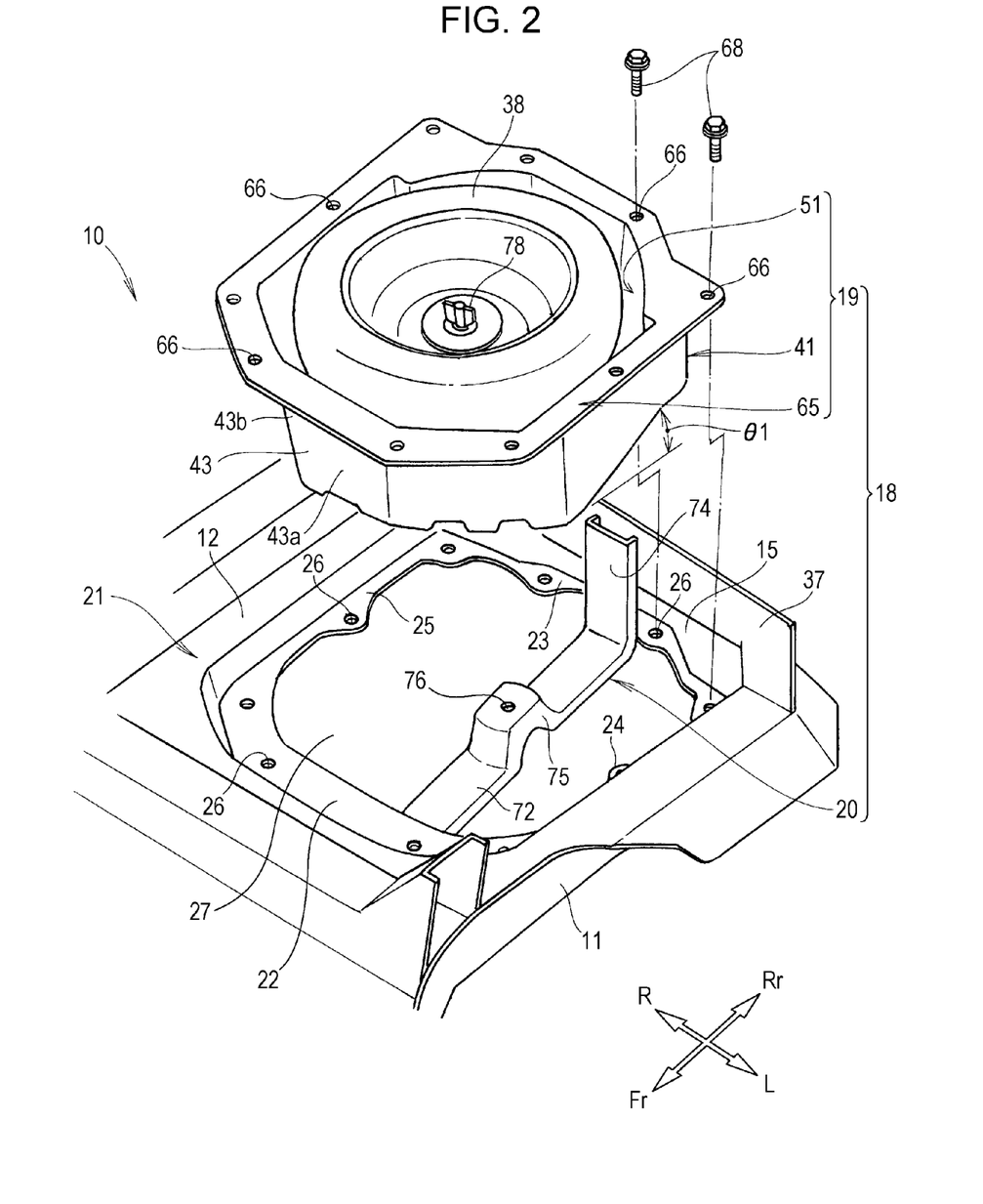
FIG. 2 is an exploded perspective view of the rear vehicle body structure of FIG. 1.

As illustrated in FIGS. 1 and 2, the rear vehicle body structure 10 includes left and right rear frames 11 and 12 spaced a predetermined distance apart from each other in a vehicle body width direction of the rear part of the vehicle body, a center cross member (front cross member) 14 laid between front ends 11a and 12a of the left and right rear frames 11 and 12 (see FIG. 3), a rear cross member 15 laid between rear ends 11b and 12b of the left and right rear frames 11 and 12, and a spare-tire storage unit 18 provided on a front side of the rear cross member 15 in the vehicle body.

The left and rear frames 11 and 12, the center cross member 14 (see FIG. 3), and the rear cross member 15 form a rectangular frame unit 21. The rectangular frame unit 21 is substantially rectangular in plan view, and has front and rear projecting portions 22 and 23 and left and right projecting portions 24 and 25 on an inner periphery thereof.

Figure 6:
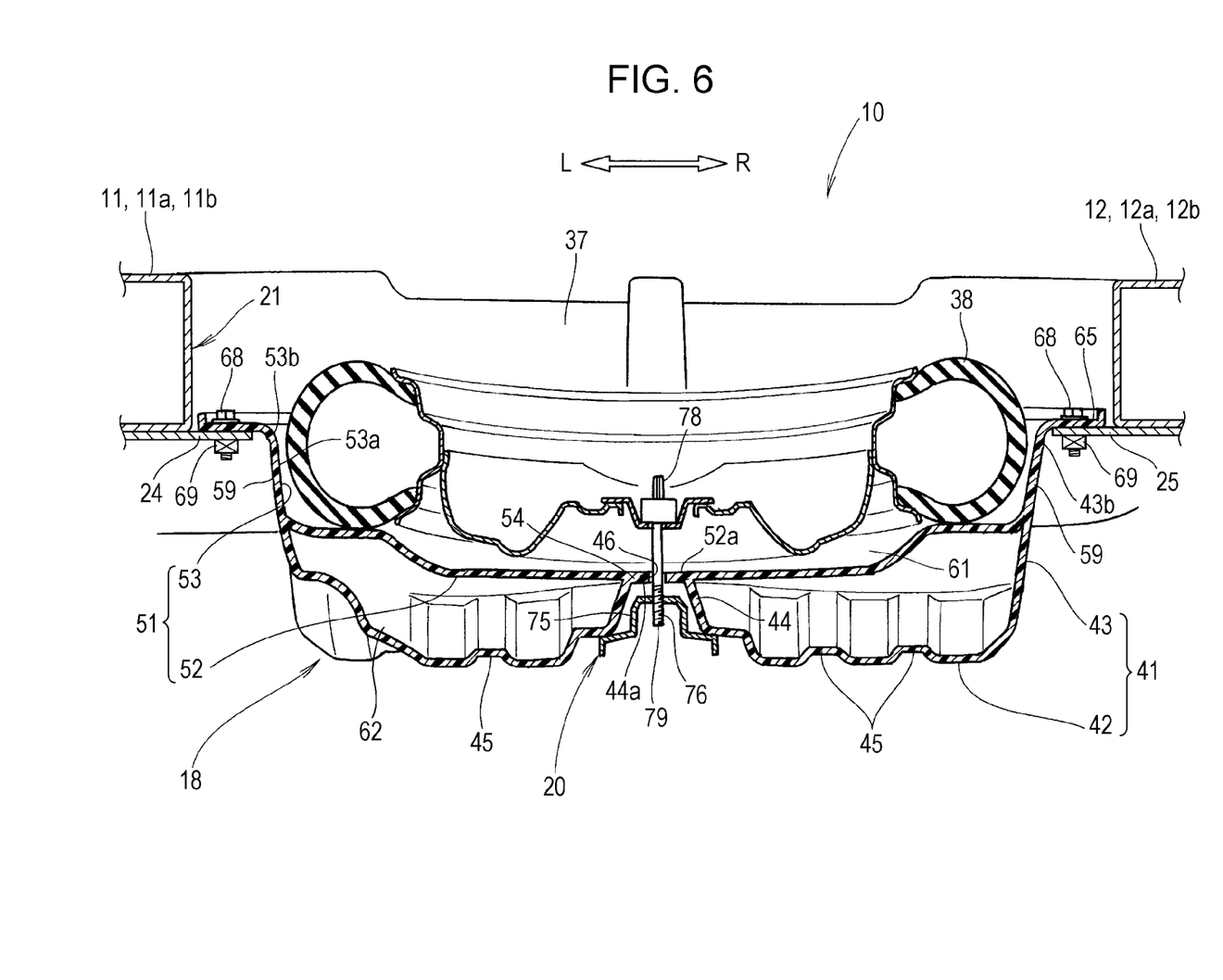
FIG. 6 is a cross-sectional view taken along line VI-VI of FIG. 1.

A unit receiving space 27 that can receive the spare-tire storage unit 18 is provided on an inner side of the front and rear projecting portions 22 and 23 and the left and right projecting portions 24 and 25 (the left projecting portion 24 is also seen in FIG. 6). The front and rear projecting portions 22 and 23 and the left and right projecting portions 24 and 25 each have a plurality of unit mounting holes 26.

The rear vehicle body structure 10 also includes a floor panel 31 supported by the left and right rear frames 11 and 12, a rear bulkhead 32 provided on an upper side of the floor panel 31, and a rear panel 37 provided at the rear cross member 15.

Figure 3:
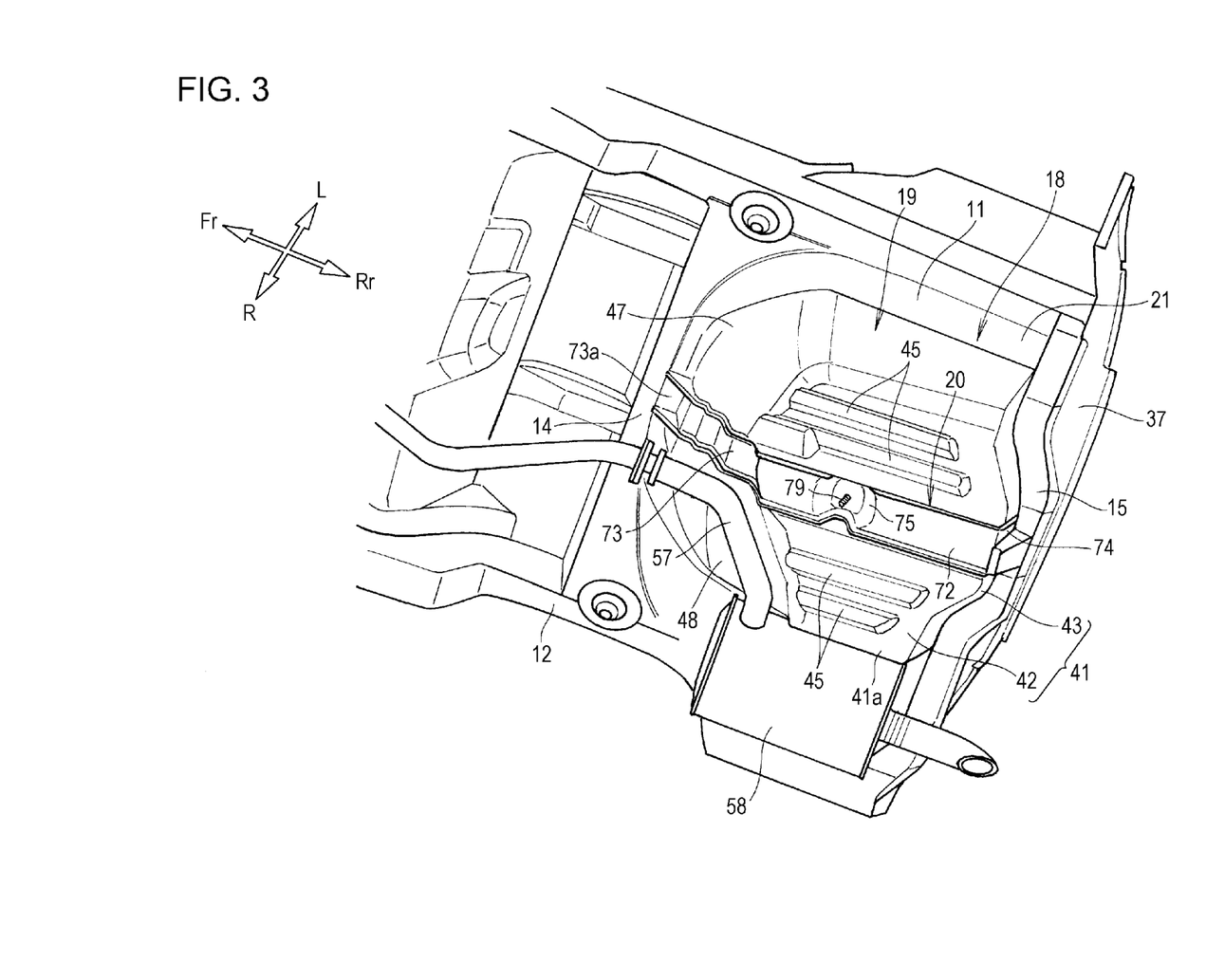
FIG. 3 is a perspective view of the rear vehicle body structure, as viewed from a lower rear side of a vehicle body.
Figure 4:
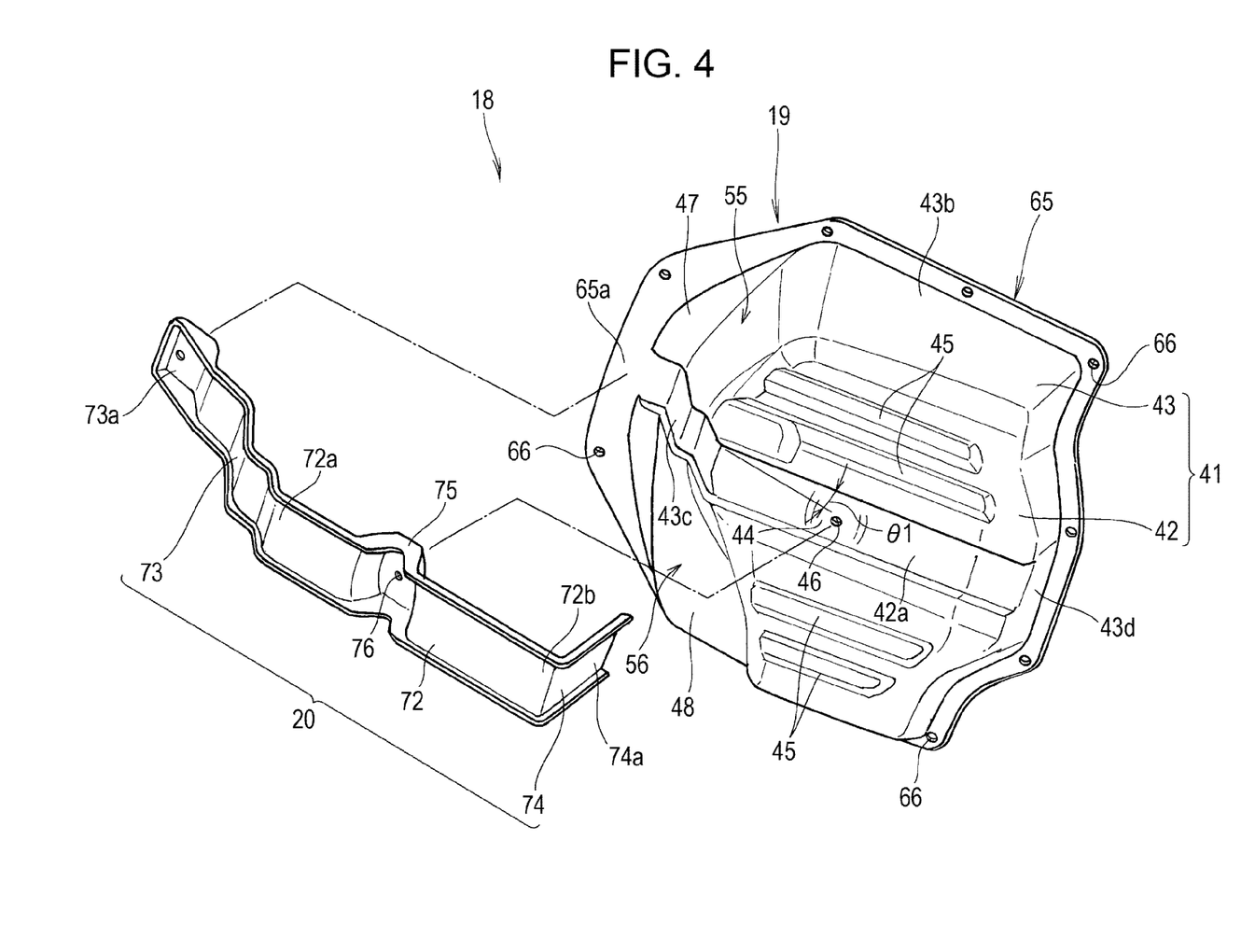
FIG. 4 is an exploded perspective view of a spare-tire storage unit of FIG. 3.

As illustrated in FIGS. 2 to 4, the spare-tire storage unit 18 can be received in the rectangular frame unit 21, and can store a spare tire 38. This spare-tire storage unit 18 includes a tire storage body 19 to be received in the rectangular frame unit 21, and a reinforcing member 20 for reinforcing the tire storage body 19.

Figure 7A:
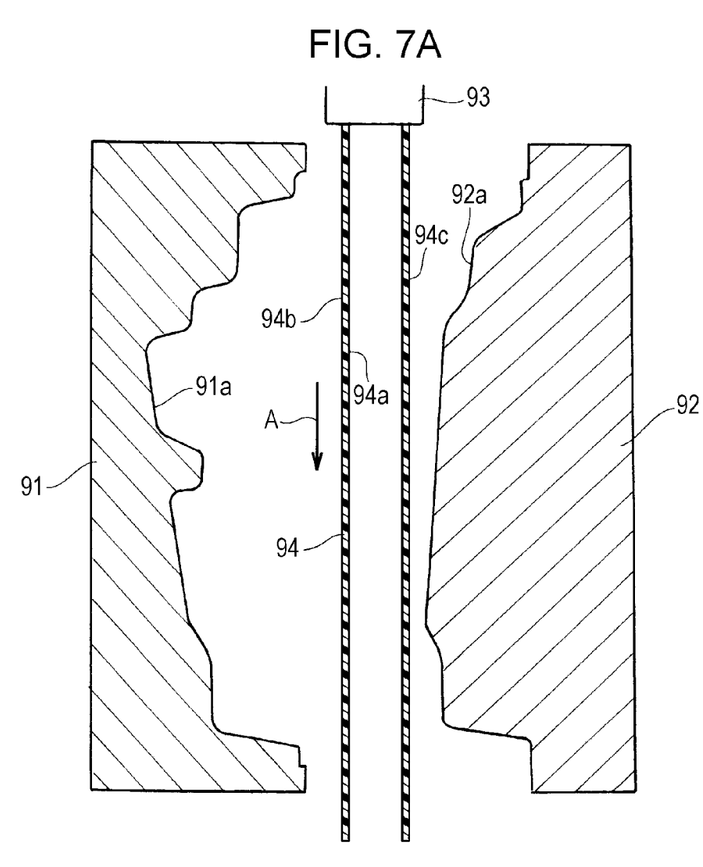
FIGS. 7A and 7B illustrate an example in which a tire storage body of the embodiment is integrally molded by blow molding.
Figure 7B:
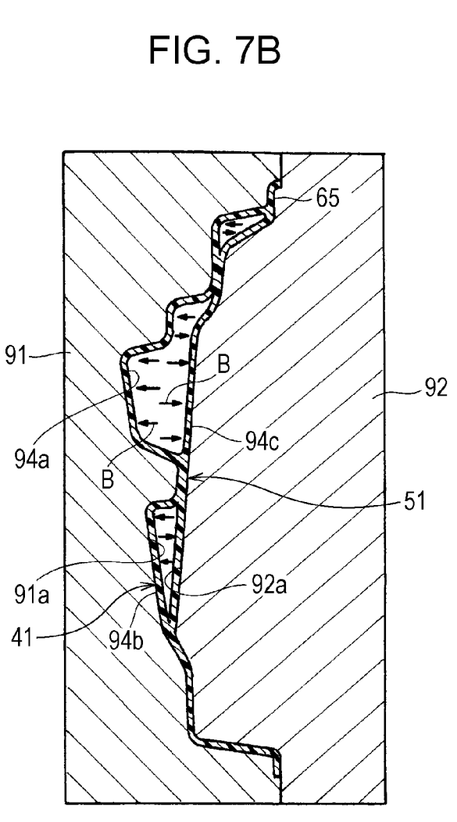

The tire storage body 19 includes a box-shaped section 41 received in the rectangular frame unit 21, a spare-tire storage section 51 provided in the box-shaped section 41, and a peripheral flange section 65 provided at an upper box portion (an upper box portion (upper portion) of a below-described box peripheral wall portion 43) 43b of the box-shaped section 41. The box-shaped section 41, the spare-tire storage section 51, and the peripheral flange section 65 are integrally molded from resin by blow molding such that the box-shaped section 41 opposes the spare-tire storage section 51. Blow molding will be described in detail with reference to FIGS. 7 and 8.

The box-shaped section 41 includes a substantially rectangular box bottom portion (bottom portion) 42, and a cylindrical box peripheral wall portion 43 standing upward from the box bottom portion 42. The box bottom portion 42 is a substantially flat inclined portion that is substantially rectangular such as to be received in the rectangular frame unit 21 (more specifically, in the unit receiving space 27) and that slopes down toward the front of the vehicle body at a slope angle θ1.

The box bottom portion 42 includes a belt-shaped recess 42a extending in the vehicle-body front-rear direction at the center of the box bottom portion 42 in the vehicle-body width direction. A raised portion 44 (also see FIGS. 5 and 6) is provided at about the center of the recess 42a in the vehicle-body front-rear direction. A plurality of beads 45 extending in the vehicle-body front-rear direction are arranged in the vehicle body width direction (right and left sides) of the recess 42a of the box bottom portion 42. The beads 45 are linear projecting portions that are raised toward a storage bottom portion 52 of the spare-tire storage section (see FIG. 5) and that extend in the vehicle-body front-rear direction. In other words, the beads 45 are formed by recessing an outer surface of the box bottom portion 42. The presence of the beads 45 increases the rigidity (so-called surface rigidity) of the box bottom portion 42.

Figure 5:
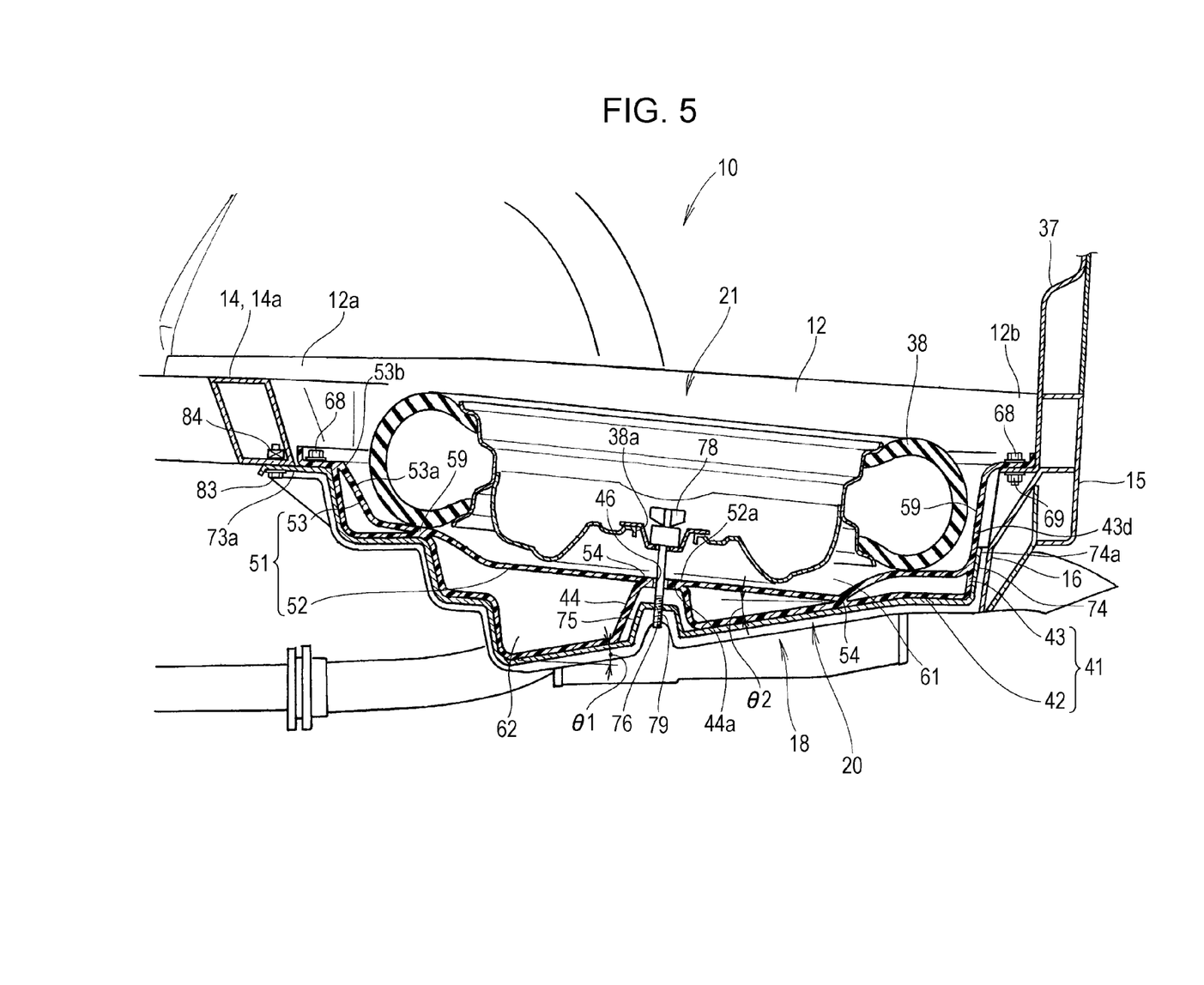
FIG. 5 is a cross-sectional view taken along line V-V of FIG. 1.

As illustrated in FIGS. 5 and 6, the raised portion 44 is raised to the storage bottom portion 52 of the spare-tire storage section 51 so that a top portion 44a thereof is integrally joined to a center portion 52a of the storage bottom portion 52. By thus raising the raised portion 44 to the storage bottom portion 52 so as to integrally join the top portion 44a to the center portion 52a of the storage bottom portion 52, the storage bottom portion 52 can be reinforced by the raised portion 44. Hence, the rigidity of the storage bottom portion 52 can be secured by the raised portion 44, and the spare tire 38 can be stably supported by the spare-tire storage section 51.

A penetrating hole 46 is provided in the top portion 44a of the raised portion 44 and the center portion 52a of the storage bottom portion 52. An outer peripheral portion 43a of the cylindrical box peripheral wall portion 43 (see FIG. 2) is substantially rectangular similarly to the box bottom portion 42, and the peripheral flange section 65 projects outward from the upper box portion 43b.

As illustrated in FIGS. 3 and 4, the box-shaped section 41 includes a first front recess (recess) 47 at the box front, and a second front recess 48 provided on a vehicle-body rear side of the first front recess 47. The second front recess 48 forms a second space 56 in which an exhaust pipe 57 can be placed. The exhaust pipe 57 leads exhaust gas from an engine (combustion chamber) to a muffler 58 provided in a right side portion 41a of the box-shaped section 41.

As illustrated in FIGS. 5 and 6, the spare-tire storage section 51 is provided in the box-shaped section 41, and is provided integrally with the upper box portion 43b. The spare-tire storage section 51 includes a spare-tire storage space 61 in which the spare tire 38 can be stored. The spare-tire storage section 51 also includes a substantially circular storage bottom portion 52, and a storage peripheral wall portion 53 standing upward from the storage bottom portion 52.

The storage bottom portion 52 is a substantially flat inclined portion that is shaped like a circle slightly larger than the spare tire 38 so as to receive the spare tire 38 and that slopes up toward the front of the vehicle body at a slope angle θ2. By thus providing the tire storage body 19 with a two-layer structure including the box-shaped section 41 and the spare-tire storage section 51, the slope angle θ1 of the box-shaped section 41 and the slope angle θ2 of the spare-tire storage section 51 can be selected independently.

Accordingly, when the storage bottom portion 52 slopes up toward the front of the vehicle body at the slope angle θ2, it can face toward the rear of the vehicle body. This allows the spare tire 38 to be easily put in and taken out of the spare-tire storage section 51.

In contrast, when the box bottom portion 42 of the box-shaped section 41 slopes down toward the front of the vehicle body at the slope angle θ1, the flow of air will not be obstructed by the box bottom portion 42 during traveling of the vehicle. This reduces the air force acting on the box bottom portion 42 during traveling of the vehicle.

The cylindrical storage peripheral wall portion 53 includes an outer peripheral portion 53a that is substantially circular similarly to the storage bottom portion 52, and an open upper storage portion (upper portion) 53b. The spare tire 38 can be put into the spare-tire storage section 51 through the open upper storage portion 53b.

A hollow portion 62 is provided between the box-shaped section 41 and the spare-tire storage section 51. By thus forming the hollow portion 62 between the box portion 41 and the spare-tire storage section 51, the weight of the tire storage body 19 can be reduced.

Further, the box bottom portion 42 of the box-shaped section 41 and the storage bottom portion 52 of the spare-tire storage section 51 are joined together at a predetermined portion 54. The predetermined portion 54 includes a portion of the top portion 44a of the raised portion 44 joined to the center portion 52a of the storage bottom portion 52.

In addition, the box peripheral wall portion 43 of the box-shaped section 41 and the storage peripheral wall portion 53 of the spare-tire storage section 51 are joined together at a predetermined portion 59. By thus joining the box bottom portion 42 and the storage bottom portion 52 at the predetermined portion 54, the rigidities of the box-shaped section 41 and the spare-tire storage section 51 can be secured. This reduces the plate thickness of the box-shaped section 41 and the plate thickness of the spare-tire storage section 51, and further reduces the weights of the box-shaped section 41 and the spare-tire storage section 51.

As illustrated in FIG. 2, the peripheral flange section 65 is a projecting portion that projects outward from the upper box portion 43b of the box peripheral wall portion 43 (also see FIGS. 5 and 6) and that can be placed on the front and rear projecting portions 22 and 23 and the left and right projecting portions 24 and 25 of the rectangular frame unit 21. The peripheral flange section 65 has a plurality of flange mounting holes 66. In a state in which the peripheral flange section 65 is placed on the front and rear projecting portions 22 and 23 and the left and right projecting portions 24 and 25, the flange mounting holes 66 are arranged coaxially with the corresponding unit mounting holes 26.

By inserting bolts 68 in the unit mounting holes 26 and the flange mounting holes 66 and screwing the inserted bolts 68 into nuts 69 (see FIG. 5), the peripheral flange section 65 is mounted on the front and rear projecting portions 22 and 23 and the left and right projecting portions 24 and 25. This allows the spare-tire storage unit 18 to be stored and supported in the rectangular frame unit 21.

As illustrated in FIGS. 3 and 4, the box bottom portion 42 of the box-shaped section 41 is substantially rectangular such as to receive the rectangular frame unit 21 (also see FIG. 2) that is also substantially rectangular. Since the box bottom portion 42 of the box-shaped section 41 has the same substantially rectangular shape as that of the rectangular frame unit 21, when the box-shaped section 41 is received in the rectangular frame unit 21, the space in the rectangular frame unit 21 can be properly covered with the box bottom portion 42. Hence, the box bottom portion 42 of the box-shaped section 41 can function as an aerodynamic undercover. The undercover is a cover usually used to cover the bottom of the rear vehicle body structure.

As illustrated in FIGS. 2 to 4, the reinforcing member 20 for supporting the box bottom portion (bottom portion) 42 of the box-shaped section 41 extends from the center cross member 14 to the rear cross member 15 along the box bottom portion 42 in the vehicle-body front-rear direction. Therefore, the box peripheral wall portion 43 of the box-shaped section 41 can be reinforced by the reinforcing member 20 only with a simple structure in which the reinforcing member 20 is merely laid between the center cross member 14 and the rear cross member 15. This secures the rigidity of the box-shaped section 41 and suppresses the cost increase of the box-shaped section 41 (that is, the tire storage body 19).

By thus securing the rigidity of the box-shaped section 41 by the reinforcing member 20, the tire storage body 19 can be formed of resin (e.g., polypropylene (PP). Hence, the tire storage body 19 does not need to be formed of resin reinforced by glass fiber (e.g., FRP), and this reduces the cost of the tire storage body 19.

The reinforcing member 20 includes an inclined member portion 72 extending in the front-rear direction along the center of the box bottom portion 42 in the vehicle width direction, a front member portion 73 provided at a front end 72a of the inclined member portion 72, and a rear member portion 74 provided at a rear end 72b of the inclined member portion 72.

The inclined member portion 72 slopes down toward the front of the vehicle body along the recess 42a of the box bottom portion 42. A support bracket 75 stands from almost the center of the inclined member portion 72 into the raised portion 44 (also see FIGS. 5 and 6). The support bracket 75 has a screw hole 76 for fixing the spare tire 38. The screw hole 76 is provided coaxially with the penetrating hole 46 (also see FIGS. 5 and 6).

The spare tire 38 can be held in the spare-tire storage section 51 using this screw hole 76. More specifically, a fixture 78 is inserted in a wheel center hole 38a of the spare tire 38 received in the spare-tire storage section 51 (see FIG. 5). Then, a thread portion 79 of the inserted fixture 78 is screwed into the screw hole 76 through the penetrating hole 46.

Thus, the spare tire 38 can be fixed in the spare-tire storage section 51 by the fixture 78. This allows the spare tire 38 to be put in the rectangular frame unit 21 with the spare-tire storage unit 18 being disposed therebetween.

The front member portion 73 has a plurality of steps such as to be arranged along a front part 43c of the box peripheral wall portion 43 and a front part 65a of the peripheral flange section 65. As illustrated in FIG. 5, a front end portion 73a of the front member portion 73 is attached to a lower center portion 14a of the center cross member 14 in the vehicle width direction by a bolt 83 and a nut 84.

As illustrated in FIG. 5, the rear member portion 74 is substantially vertical such as to be arranged along a rear part 43d of the box peripheral wall portion 43 (also see FIG. 4), and an upper end portion 74a of the rear member portion 74 is provided (supported) on the rear cross member 15 with a bracket 16 being disposed therebetween. The upper end portion 74a is attached (supported) to the bracket 16 by a bolt and a nut (not illustrated). Alternatively, the upper end portion 74a may be directly attached to the rear cross member 15.

That is, the reinforcing member 20 is laid between the center cross member 14 and the rear cross member 15. By thus being laid between the center cross member 14 and the rear cross member 15, the reinforcing member 20 is firmly attached to the rectangular frame unit 21.

Next, a description will be given of an example in which the box-shaped section 41, the spare-tire storage section 51, and the peripheral flange section 65, which form the tire storage body 19, are integrally molded by blow molding, with reference to FIGS. 7 and 8. As illustrated in FIG. 7A, in a state in which a first mold 91 and a second mold 92 are opened, a parison (a tube of melting resin) 94 is extruded from an extruder 93 between the first mold 91 and the second mold 92, as shown by arrow A.

Then, as illustrated in FIG. 7B, the first mold 91 and the second mold 92 are closed to clamp the parison 94. By blowing compressed air into the parison 94 in this state, air pressure is applied to inner walls 94a of the parison 94, as shown by arrows B.

When the air pressure is applied to the inner walls 94a of the parison 94, the parison 94 is pressed against molding surfaces 91a and 92a of the first and second molds 91 and 92. The molding surfaces 91a and 92a of the first and second molds 91 and 92 shape the parison 94. More specifically, one side part 94b (see FIG. 7A) of the cylindrical parison 94 forms the box-shaped section 41 and the other side part 94c (see FIG. 7A) forms the spare-tire storage section 51.

Simultaneously, the peripheral flange section 65 is molded integrally with the upper box portion 43b of the box-shaped section 41. Hence, the box-shaped section 41, the spare-tire storage section 51, and the peripheral flange section 65 (tire storage body 19) can be integrally molded from the same resin.

Figure 8:
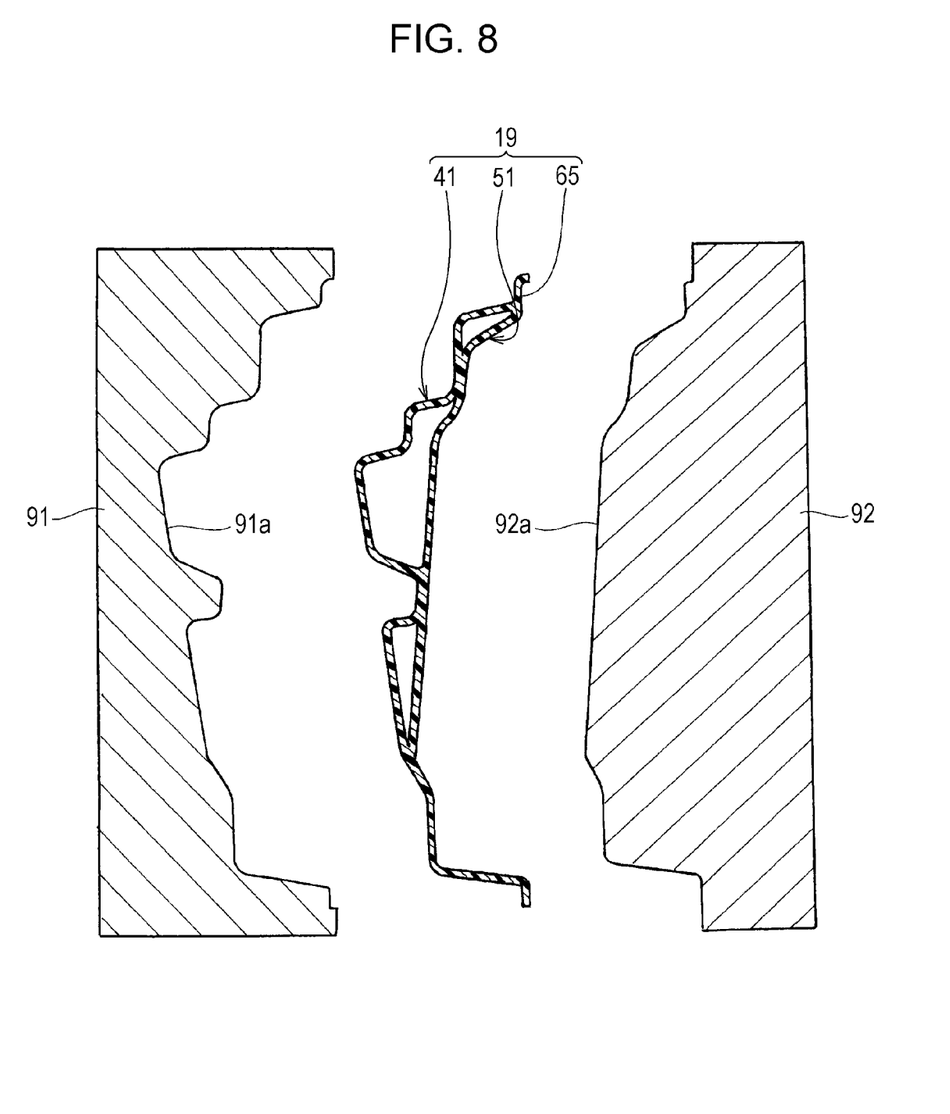
FIG. 8 illustrates the example in which the tire storage body of the embodiment is integrally molded by blow molding.

As illustrated in FIG. 8, the box-shaped section 41, the spare-tire storage section 51, and the peripheral flange section 65 (tire storage body 19) between the first mold 91 and the second mold 92 are solidified by cooling. After the tire storage body 19 is solidified, the first mold 91 and the second mold 92 are opened, and the tire storage body (molded piece) 19 is taken out from between the opened first and second molds 91 and 92.

In this way, the box-shaped section 41, the spare-tire storage section 51, and the peripheral flange section 65 (tire storage body 19) are integrally molded by blow molding. Thus, even when the box-shaped section 41, the spare-tire storage section 51, and the peripheral flange section 65 that constitute the tire storage body 19 have different shapes, the tire storage body 19 can be easily molded integrally. This leads to cost reduction.

Figure 9:
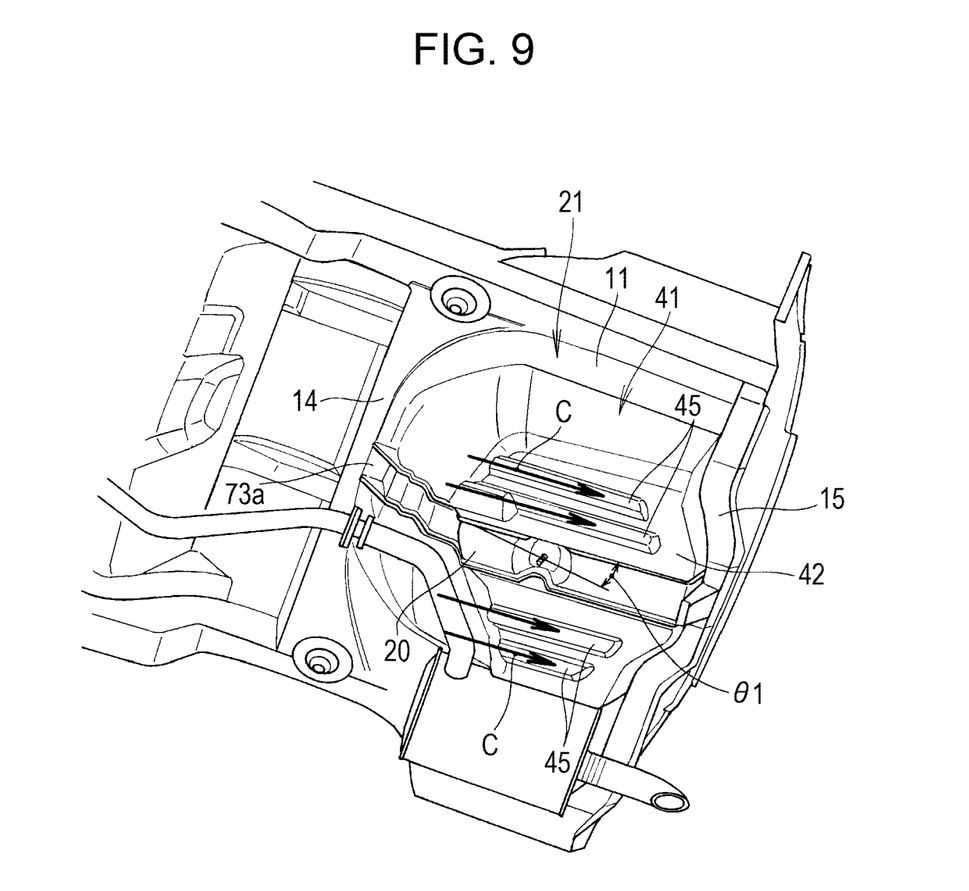
FIG. 9 illustrates an example in which air is blown along a box bottom portion of a box-shaped section in the embodiment.

Next, a description will be given of an example in which air is blown along the box bottom portion 42 of the box-shaped section 41 during traveling of the vehicle, with reference to FIG. 9. As illustrated in FIG. 9, the box bottom portion 42 of the box-shaped section 41 is made substantially rectangular such as to be received in the rectangular frame unit 21 that is also substantially rectangular. By providing the box bottom portion 42 of the box-shaped section 41 with the same substantially rectangular shape as that of the rectangular frame unit 21, when the box-shaped section 41 is received in the rectangular frame unit 21, the space in the rectangular frame unit 21 can be properly covered with the box bottom portion 42.

Accordingly, as described above, the box bottom portion 42 of the box-shaped section 41 can function as an aerodynamic undercover. This allows air to smoothly flow in one direction along the box bottom portion 42 of the box-shaped section 41 in a constant flow speed state (so-called flow-regulated state), as shown by the arrows C.

Since the box bottom portion 42 of the box-shaped section 41 functions as the aerodynamic undercover, it is unnecessary to prepare a separate undercover. This achieves weight reduction and cost reduction.

By sloping down toward the front of the vehicle body at the slope angle θ1, the box bottom portion 42 of the box-shaped section 41 can slope up toward the rear of the vehicle body. Therefore, the flow of air will not be obstructed by the box bottom portion 42 of the box-shaped section 41 during traveling of the vehicle, and the air force acting on the box bottom portion 42 during traveling of the vehicle can be reduced.

In addition, since the box bottom portion 42 of the box-shaped section 41 has a plurality of beads 45 extending in the vehicle-body front-rear direction, air can more smoothly flow along the beads 45 during traveling of the vehicle. This further reduces the air force acting on the box bottom portion 42 during traveling of the vehicle.

The present invention is not limited to the above-described embodiment, and appropriate modifications and improvements may be made. For example, the shapes and structures of the rear vehicle body structure 10, the left and rear frames 11 and second connector 12, the center cross member 14, the rear cross member 15, the spare-tire storage unit 18, the reinforcing member 20, the rectangular frame unit 21, the spare tire 38, the wheel center hole 38a, the box-shaped section 41, the box bottom portion 42, the upper box portion 43b, the raised portion 44, the beads 45, the first front recess 47, the spare-tire storage section 51, the upper storage portion 53b, the predetermined portions 54 and 59, the hollow portion 62, the peripheral flange section 65, the support bracket 75, the screw hole 76, and the fixture 78 adopted in the above embodiment are not limited to the illustrated shapes and structures, and may be changed appropriately.

The embodiment of the present invention is suitably applied to an automobile including a rear vehicle body structure in which a rectangular frame unit is formed by left and right rear frames and front and rear cross members so as to store a spare tire.

According to the embodiment of the present invention, the bottom portion of the box-shaped section is substantially rectangular such as to be received in the rectangular frame unit. By providing the bottom portion of the box-shaped section with the same substantially rectangular shape as that of the rectangular frame unit, when the box-shaped section is received in the rectangular frame unit, the space in the rectangular frame unit can be properly covered with the bottom portion of the box-shaped section. Hence, the bottom portion of the box-shaped section can have a function as an aerodynamic undercover. This allows air to smoothly flow in one direction along the bottom portion of the box-shaped section in a constant flow velocity state (so-called flow-regulated state) during traveling of the vehicle.

Since the bottom portion of the box-shaped section has a function as an aerodynamic undercover, it is unnecessary to prepare a separate undercover. This leads to weight reduction and cost reduction. The undercover is usually used to cover the bottom of the rear vehicle body structure.

In addition, the reinforcing member extends along the bottom portion in the front-rear direction of the vehicle body, and is laid between the front and rear cross members. Therefore, the bottom portion of the box-shaped section can be reinforced by the reinforcing member only with a simple structure in which the reinforcing member is merely laid between the front and rear cross members. This secures rigidity of the box-shaped section and suppresses the cost increase.

Preferably, the box-shaped section and the spare-tire storage section are integrally molded by blow molding in a manner such as to oppose each other.

In this case, the box-shaped section and the spare-tire storage section are integrally molded by blow molding. Hence, even when the box-shaped section and the spare-tire storage section have different shapes, they can be integrally molded with ease. This leads to cost reduction.

Preferably, a hollow portion is provided between the box-shaped section and the spare-tire storage section, and the box-shaped section and the spare-tire storage section are joined at a predetermined portion.

In this case, the hollow portion is provided between the box-shaped section and the spare-tire storage section, and the box-shaped section and the spare-tire storage section are joined at the predetermined portion. Since the hollow portion is provided between the box-shaped section and the spare-tire storage section, the total weight of the box-shaped section and the spare-tire storage section can be reduced.

In addition, since the box-shaped section and the spare-tire storage section are joined at the predetermined portion, rigidities of the box-shaped section and the spare-tire storage section can be secured. This reduces the plate thicknesses of the box-shaped section and the spare-tire storage section, and further reduces the total weight of the box-shaped section and the spare-tire storage section.

Preferably, a raised portion raised to the spare-tire storage section is provided at a center of the bottom portion, and a support bracket stands from the reinforcing member into the raised portion. The support bracket has a screw hole for fixing the spare tire. The spare tire is fixed in the spare-tire storage section by inserting a fixture in a wheel center hole of the spare tire received in the spare-tire storage section and screwing the fixture in the screw hole.

In this case, the raised portion of the bottom portion is raised to the spare-tire storage section. Hence, the spare-tire storage section can be reinforced by the raised portion. This secures rigidity of the spare-tire storage section, and the spare-tire storage section stably supports the spare tire.

Preferably, the bottom portion slopes down toward the front of the vehicle body, and has a bead extending in the front-rear direction of the vehicle body.

In this case, since the bottom portion slopes down toward the front of the vehicle body, it can slope up toward the rear of the vehicle body. Thus, the bottom portion of the box-shaped section does not obstruct the flow of air during traveling of the vehicle, and the air force acting on the bottom portion during traveling of the vehicle can be reduced.

Further, since the bottom portion of the box-shaped section has the bead extending in the front-rear direction of the vehicle body, air can more smoothly flow along the bead during traveling of the vehicle. Therefore, the air force acting on the bottom portion during traveling of the vehicle can be reduced further. In addition, when the bottom portion has a plurality of beads, the rigidity (so-called surface rigidity) of the bottom portion can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A rear vehicle body structure comprising:
    a rectangular frame having a substantially rectangular shape in a plan view and comprising left and right rear frames and front and rear cross members so as to contain a spare tire;
    a box-shaped section having a substantially rectangular box bottom portion so as to be placed in the rectangular frame, the box bottom portion being downwardly inclined toward a front side of a vehicle body;
    a spare-tire storage section provided in the box-shaped section and having an opening at an upper part of the box-shaped section to receive the spare tire and a storage bottom portion to support the spare tire, the box-shaped section and the spare-tire storage section being integrally molded by blow molding using resin to face each other across a hollow portion, the storage bottom portion being upwardly inclined toward the front side of the vehicle body; and
    a peripheral flange projecting outward from the upper part so as to be attached to the rectangular frame.

2. The rear vehicle body structure according to claim 1, further comprising:
    a reinforcing member to which the spare tire is to be fixed, the reinforcing member extending along the box bottom portion in a front-rear direction of the vehicle body and being laid between the front and rear cross members.

3. The rear vehicle structure body according to claim 1, wherein a hollow portion is provided between the box-shaped section and the spare-tire storage section, and
    wherein the box-shaped section and the spare-tire storage section are joined at a predetermined portion.

4. The rear vehicle body structure according to claim 1, wherein a raised portion raised to the spare-tire storage section is provided at a center of the bottom portion,
    wherein a support bracket stands from the reinforcing member into the raised portion, and has a screw hole to be used to fix the spare tire, and
    wherein the spare tire is fixed in the spare-tire storage section by inserting a fixture in a wheel center hole of the spare tire received in the spare-tire storage section and screwing the fixture in the screw hole.

5. The rear vehicle body structure according to claim 1, wherein the box bottom portion has a bead extending in the front-rear direction of the vehicle body.

6. The rear vehicle structure body according to claim 2, wherein a hollow portion is provided between the box-shaped section and the spare-tire storage section, and
    wherein the box-shaped section and the spare-tire storage section are joined at a predetermined portion.

7. The rear vehicle body structure according to claim 2, wherein a raised portion raised to the spare-tire storage section is provided at a center of the bottom portion,
    wherein a support bracket stands from the reinforcing member into the raised portion, and has a screw hole to be used to fix the spare tire, and
    wherein the spare tire is fixed in the spare-tire storage section by inserting a fixture in a wheel center hole of the spare tire received in the spare-tire storage section and screwing the fixture in the screw hole.

8. The rear vehicle body structure according to claim 3, wherein a raised portion raised to the spare-tire storage section is provided at a center of the bottom portion,
    wherein a support bracket stands from the reinforcing member into the raised portion, and has a screw hole to be used to fix the spare tire, and
    wherein the spare tire is fixed in the spare-tire storage section by inserting a fixture in a wheel center hole of the spare tire received in the spare-tire storage section and screwing the fixture in the screw hole.

9. The rear vehicle body structure according to claim 6, wherein a raised portion raised to the spare-tire storage section is provided at a center of the bottom portion,
    wherein a support bracket stands from the reinforcing member into the raised portion, and has a screw hole to be used to fix the spare tire, and
    wherein the spare tire is fixed in the spare-tire storage section by inserting a fixture in a wheel center hole of the spare tire received in the spare-tire storage section and screwing the fixture in the screw hole.

10. The rear vehicle body structure according to claim 2, wherein the box bottom portion has a bead extending in the front-rear direction of the vehicle body.

11. The rear vehicle body structure according to claim 3, wherein the box bottom portion has a bead extending in the front-rear direction of the vehicle body.

12. The rear vehicle body structure according to claim 4, wherein the box bottom portion has a bead extending in the front-rear direction of the vehicle body.

13. The rear vehicle body structure according to claim 6, wherein the box bottom portion has a bead extending in the front-rear direction of the vehicle body.

14. The rear vehicle body structure according to claim 7, wherein the box bottom portion has a bead extending in the front-rear direction of the vehicle body.

15. The rear vehicle body structure according to claim 8, wherein the box bottom portion has a bead extending in the front-rear direction of the vehicle body.

16. The rear vehicle body structure according to claim 9, wherein the box bottom portion has a bead extending in the front-rear direction of the vehicle body.

17. A rear vehicle body structure comprising:
    a rectangular frame having a substantially rectangular shape in a plan view and comprising left and right rear frames and front and rear cross members so as to contain a spare tire; and
    a tire storage body comprising:
        a box-shaped section having a substantially rectangular bottom so as to be placed in the rectangular frame; and
        a spare-tire storage section provided in the box-shaped section and having an opening at an upper part of the box-shaped section to receive the spare tire,
    wherein the tire storage body is fitted within the rectangular frame and wherein bolts attach a peripheral flange to the rectangular frame,
    wherein a lowermost outer surface of tire storage portion slopes down toward a front of the vehicle body from a rear portion of the lowermost outer surface to a front portion of the lowermost outer surface, and
    wherein the lowermost outer surface of tire storage portion includes linear recesses that extend from the front portion of the lowermost outer surface to the rear portion of the lowermost outer surface.

18. A rear vehicle body structure comprising:
a rectangular frame having a substantially rectangular shape in a plan view and comprising left and right rear frames and front and rear cross members so as to contain a spare tire; and
a tire storage body comprising:
   a box-shaped section having a substantially rectangular bottom so as to be placed in the rectangular frame;
   a spare-tire storage section provided in the box-shaped section and having an opening at an upper part of the box-shaped section to receive the spare tire; and
   a peripheral flange projecting outward from the upper part so as to be attached to the rectangular frame,
wherein a lowermost outer surface of tire storage portion slopes down toward a front of the vehicle body from a rear portion of the lowermost outer surface to a front portion of the lowermost outer surface.

19. The rear vehicle body structure according to claim 18, wherein the lowermost outer surface of tire storage portion includes linear recesses that extend from the front portion of the lowermost outer surface to the rear portion of the lowermost outer surface.

* * * * *